United States Patent Office 2,901,400
Patented Aug. 25, 1959

2,901,400

CRYPTOCRYSTALLINE CALCIUM PYROPHOSPHATE AND DENTIFRICE COMPOSITION COMPRISING THE SAME

Fritts William Thomas, St. Louis, Mo., assignor to Monsanto Chemical Company, St. Louis, Mo., a corporation of Delaware No Drawing. Application December 30, 1955
Serial No. 556,443

2 Claims. (Cl. 167—93)

This invention relates to a novel form of calcium pyrophosphate. More particularly, this invention relates to a form of calcium pyrophosphate which is especially suitable as a polishing agent in dentifrice compositions, particularly dentifrice compositions containing soluble fluorides.

It is now well known that the application of certain soluble fluorides to the teeth prevents or retards the development of dental caries. One way in which the fluorides are applied to the teeth is by incorporation into dentifrice cleansing and polishing compositions such as toothpastes and toothpowders. Toothpastes and powders contain substantial amounts of polishing agents. These polishing agents must be carefully selected and controlled from the point of view of hardness so that normal use of such pastes and powders will not cause undue tooth injury by severe abrasion.

Dicalcium orthophosphates are presently widely used as polishing agents in dentifrice cleansing compositions. However, if an orthophosphate is utilized in a dentifrice composition containing a soluble fluoride, the fluoride will react with the orthophosphate to form an insoluble fluoroapatite and/or calcium fluoride, thereby destroying the availability and effectiveness of the fluoride for the prevention of dental caries. Normal calcium pyrophosphate will not react with fluorides to form insoluble fluorides, so that from the point of view of compatability with soluble fluoride constituents in dentifrice cleansing compositions, calcium pyrophosphate would be a satisfactory substitute for the calcium orthophosphate.

However, in the form which normal calcium pyrophosphate has been produced in the past, it is gritty and abrasive, and consequently too injurious to the teeth to be a suitable polishing ingredient in a dentifrice cleansing composition.

It has now been found that calcium pyrophosphate can be produced in a form suitably soft for utilization as a dentifrice polishing agent, and that this soft form of calcium pyrophosphate is satisfactorily compatible with fluoride-containing dentifrice cleansing compositions.

The "hardness" or "polishing power" of the novel form of calcium pyrophosphate of the present invention may be expressed in terms of a convenient numerical scale determined and defined in accordance with the disclosure in the Moss et al. patent, U.S. 2,697,024. The calcium pyrophosphate which was available prior to the present invention generally had a polishing power of between about 30 and about 40, although in a few isolated instances material might have been obtained having a polishing power as low as about 25. In contrast thereto, the calcium pyrophosphate of the present invention can have a polishing power as low as about 5 or 6—generally running between about 6 and about 25. The preferred range of hardness or polishing power for use in fluorine-containing dentifrice compositions is between about 10 and about 18.

The soft calcium pyrophosphate of the present invention is a granular cryptocrystalline form having an average particle size between about 1 and about 5 microns, and being substantially free of any particles larger than about 50 microns. Preferably, more than 95 percent of the material will fall between particle sizes of 1 micron and 40 microns.

The term "cryptocrystalline" is used herein in the usual sense of being "so finely crystalline (that is, made up of such minute crystals) that its crystalline nature is but vaguely revealed even in a thin section by transmitted polarized light." (Van Nostrand's Scientific Encyclopedia, The Van Nostrand Company, Inc., New York, 2nd edition (1947), page 413.) The cryptocrystalline particles of the calcium pyrophosphate of the present invention are made up of crystallites having sizes between about 0.05 and about 2 microns, most of which fall between about 0.1 and about 1 micron. When the material is viewed through a petrographic microscope (magnification $200 \times$) using polarized light and the object is rotated between crossed Nicol prisms, there are no intermittent flashes of light (such as usually appear when viewing an anisotropic crystalline material under these conditions). Instead, the field appears uniformly gray. This indicates that the individual crystallites making up the calcium pyrophosphate particles have a maximum size of about 1 or 2 microns. The very slight broadening of the diffraction maxima in the X-ray diffraction patterns obtained from the present cryptocrystalline calcium pyrophosphate indicate that most of the individual crystallites have sizes greater than about 0.1 or 0.2 micron. This latter figure is confirmed by measurements upon electron photomicrographs. Electron photomicrographs also disclose that the present calcium pyrophosphate particles (i.e., the agglomerates or clusters of the above-described crystallites) have a maximum size of about 50 microns, and that the greatly predominant proportion of these particles fall between about 1 and about 40 microns in size. These figures are also confirmed by visual observation with the aforementioned petrographic microscope. The average size of the calcium pyrophosphate particles (as determined by a Fisher Sub-Sieve-Sizer) is found to be between about 0.5 and about 3 microns.

The degree of hardness, i.e., polishing power, of the present calcium pyrophosphate product is almost completely determined by the degree of cryptocrystallinity thereof. However, the sizes of the clusters or agglomerates of the crystallites are of practical importance for use in toothpastes and powders. If there are too many large clusters, the dentifrice will feel gritty and will be unsatisfactory from the point of view of customer acceptance. Consequently, the average particle size of the product should generally be maintained below about 5 microns.

The present cryptocrystalline calcium pyrophosphate is prepared by the controlled slow molecular dehydration of anhydrous dicalcium orthophosphate—i.e., by the controlled slow thermal condensation of the dicalcium orthophosphate, $CaHPO_4$, to the tetracalcium pyrophosphate, $Ca_2P_2O_7$. Additional care must be taken to avoid heating the cryptocrystalline calcium pyrophosphate for too long a time or at too high a temperature after the formation thereof or else the crystallites of the cryptocrystalline material will tend to grow to the large crystal sized products of the prior art and will not be suitably soft for use as a dentifrice polishing agent.

A preferred method for forming the present cryptocrystalline calcium pyrophosphate is by slow molecular dehydration of cryptocrystalline anhydrous dicalcium orthophosphate. Cryptocrystalline anhydrous dicalcium orthophosphate can be readily produced by the slow dehydration of dicalcium orthophosphate dihydrate. This latter dehydration is not a molecular dehydration (as in the case of condensation of orthophosphate to pyrophosphate) but is the process of releasing the water of hydration, generally indicated by formula as follows:

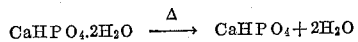

The cryptocrystalline anhydrous dicalcium orthophosphate is preferably prepared from the so-called "stabilized" dicalcium orthophosphate dihydrate described in the patent to Moss et al., U.S. 2,287,699. Unstabilized dicalcium orthophosphate dihydrate can also be used to form cryptocrystalline anhydrous dicalcium orthophosphate, but use of the unstabilized material will require closer control of reaction variables (especially temperature and time) because with all other factors being equal, the stabilized dicalcium orthophosphate dihydrate will tend to be dehydrated more slowly than the unstabilized dicalcium orthophosphate dihydrate.

Another preferred method for preparing the present cryptocrystalline calcium pyrophosphate is by the slow controlled molecular dehydration of the anhydrous dicalcium orthophosphate prepared as described in the patent to Moss et al., U.S. 2,697,024. This latter anhydrous dicalcium orthophosphate (which is produced by crystallization of the dihydrate from aqueous solution, followed by milling and heating to convert to the anhydrous dicalcium orthophosphate) is not cryptocrystalline. However, it is readily converted to cryptocrystalline calcium pyrophosphate in accordance with the present invention.

As will be apparent from the following examples, the actual reaction time required to convert the dicalcium orthophosphates to the present cryptocrystalline calcium pyrophosphate will depend to a great extent upon the particular type of process utilized (e.g., whether the conversion is carried out in an oven, fluidized bed, rotary calciner, etc.), upon the temperatures to which the reactants are exposed and heated, upon the nature and particle size of the raw material being converted, etc. For example, the heat transfer between gases and solids is much more effective in a fluidized bed than in a rotary calciner, so that with all other factors being equal the gas temperature for conversion in a fluidized bed reactor can generally be lower than in a rotary calciner. Likewise, it has been found that very finely milled anhydrous dicalcium orthophosphate will not condense as fast as large particle sized anhydrous dicalcium phosphate under otherwise comparable conditions. Consequently, when using the smaller particle sized dicalcium orthophosphate higher temperatures can be tolerated without adversely affecting the cryptocrystallinity of the resulting calcium pyrophosphate.

Although it is not possible to give a complete and rigorous definition of the interdependency of all of the possible process variables, both the general and the specific procedures to follow in practicing the present invention will be quite apparent from the foregoing discussion and the following examples. It should also be apparent how to modify particular process variables in order to obtain desired variations in product characteristics. Thus, if under any particular set of conditions the calcium pyrophosphate product is harder than desired, it can be made softer by decreasing the rate of molecular dehydration—such as by lowering the conversion temperature, by utilizing smaller particle size reactants, etc.

*Example 1*

Sixty pounds of dicalcium orthophosphate dihydrate stabilized as in U.S. 2,287,699 and milled to give particle sizes between 2 and 38 microns (average particle diameter 4.1 microns) was placed in a stainless steel pan in a drying oven. The oven temperature was then raised from room temperature to 550° C. over the course of 4 hours and then maintained at 550° C. for an additional 16 hours. The resulting product was a cryptocrystalline calcium pyrophosphate having a polishing power of 15.5.

*Example 2*

Forty pounds of dicalcium orthophosphate dihydrate stabilized as in the preceding example, but having particle sizes between 2 and 590 microns was fluidized in a gas stream of sufficiently high temperature to maintain the bed temperature between 50° C. and 100° C. for a period of 1¾ hours to produce anhydrous dicalcium orthophosphate. The fluidized bed temperature was then slowly raised (by raising the fluidizing gas temperature and also by utilizing electrical resistance heaters) until the bed temperature had been increased to about 135° C. after 2 more hours. Heating was continued for another 4½ hours, the temperature having been slowly increased to 650° C. by the end of this period. The solids were then withdrawn from the fluidizer, cooled and milled to a product having particle sizes between about 1 and about 40 microns. The resulting product, cryptocrystalline calcium pyrophosphate, had a polishing power of 12.8.

*Example 3*

Two hundred and ninety grams of anhydrous dicalcium orthophosphate produced as described in the first portion of the process of Example 2 was heated for 1 hour in a laboratory oven at 600° C. The resulting cryptocrystalline calcium pyrophosphate had a polishing power of 12.4.

*Example 4*

Three thousand and twenty grams of stabilized dicalcium orthophosphate dihydrate milled to a range of particle sizes between 2 and 38 microns was heated in a laboratory rotary calciner for 1.5 hours, during which time the temperature of the material was raised from room temperature to about 700° C. The solids were then removed from the calciner, cooled and milled to break up crystalline agglomerates. The resulting cryptocrystalline calcium pyrophosphate had a polishing power of 14.7.

*Example 5*

Three thousand and forty pounds of stabilized and milled dicalcium orthophosphate dihydrate (the same as utilized in the preceding example) was continuously passed through a rotary calciner at the rate of about 935 pounds per hour. (Retention time was approximately 20 minutes.) While in the calciner, the solids were heated by a countercurrent flow of gas entering at 1175° C. and leaving at a temperature of about 210° C. The gas contained about 10 volume percent of steam. The solids entered the calciner at a room temperature and left at about 565° C. After cooling and milling, the resulting product was found to be cryptocrystalline calcium pyrophosphate having a polishing power of 12.4.

*Example 6*

Forty pounds of moist precipitated anhydrous dicalcium orthophosphate (precipitated from aqueous solution at a temperature above 70° C.) was introduced into a fluidized bed reactor and maintained at a temperature slightly below 100° C. for about 1 hour. After this first hour, the bed temperature was slowly increased to about 400° C. over a period of about 2¾ hours and then further increased to 650° C. during an additional 1¾ hours. The solids were then removed from the fluidizer, cooled and milled to a size between about 1 and about 40 microns. This cryptocrystalline calcium pyrophosphate product had a polishing power of about 15.8.

*Example 7*

Fifty pounds of stabilized dicalcium orthophosphate dihydrate was placed in a fluidized reactor and maintained at a temperature slightly below 100° C. for about 40 minutes. The temperature of the fluidized bed was then slowly raised so that it reached about 400° C. after 1¼ hours and 650° C. after an additional 2½ hours. The resulting cryptocrystalline calcium pyrophosphate was cooled and milled and found to have a polishing power of 9.8.

The present novel cryptocrystalline form of calcium pyrophosphate should not be confused with the various different crystalline modifications of calcium pyrophosphate designated as the $\alpha$, $\beta$ and $\gamma$ forms. These latter forms involve changes in the crystal structure and have unique X-ray patterns. The present cryptocrystalline materials involve only changes in crystallite sizes. In most cases, the soft cryptocrystalline calcium pyrophosphates have been identified as the more common $\gamma$ form, but samples have also been prepared which contained substantial proportions of the $\beta$-form.

The pyrophosphate of the present invention is utilized in dentifrice compositions in substantially the same manner and in substantially the same proportions as other polishing agents are used. For example, toothpastes formulated with this pyrophosphate will usually contain between about 30 weight percent and about 60 weight percent, and preferably between about 40 weight percent and about 50 weight percent, of the pyrophosphate, between about 35 weight percent and about 65 weight percent, and preferably between about 45 weight percent and about 55 weight percent, of aqueous glycerine and/or sorbitol solutions (around 40–60% solutions), between about 0.25 weight percent and about 3 weight percent of a detergent, about 1 percent or so of a stabilizing or bodying agent, and small amounts of flavoring, coloring and preservative materials. The fluoride utilized in such a dentifrice will generally be a water-soluble salt such as NaF, $AlF_3$, $SnF_2$ or $NH_4F$, etc., and will be utilized in amounts which yield a fluoride ion concentration of 0.05 to 0.2% by weight.

Toothpowders generally contain between about 85 weight percent and about 99 weight percent of the polishing agent, with remainder made up of small amounts of detergents, flavoring agents, etc., as mentioned above, as well as the aforementioned 0.05 to 0.2% weight percent of fluoride.

The various detergents, stabilizing agents, flavoring agents, coloring agents, preservatives, etc., which can be incorporated into the foregoing formulations are well known to those skilled in the dentifrice art, so it will not be necessary to lengthen the present specification by repeating such prior art. The following formulations is an example of a typical toothpaste using the pyrophosphate of this invention.

| | Weight percent |
|---|---|
| Cryptocrystalline calcium pyrophosphate | 45.0 |
| Aqueous glycerine solution (50%) | 50.8 |
| Sodium lauryl sulfate | 2.0 |
| Essential oils | 0.5 |
| Gums (karaya and tragacanth) | 1.4 |
| Saccharine | 0.1 |
| Sodium fluoride | .2 |

I claim:
1. Calcium pyrophosphate in the form of a particulate cryptocrystalline solid having an average particle size below about 5 microns prepared by the slow molecular dehydration of anhydrous dicalcium orthophosphate.

2. A dentifrice composition containing a dental-caries-retarding water-soluble fluoride and an effective dentifrice polishing concentration of calcium pyrophosphate, said pyrophosphate being in the form of a particulate cryptocrystalline solid having an average particle size below about 5 microns prepared by the slow molecular dehydration of anhydrous dicalcium orthophosphate.

References Cited in the file of this patent

UNITED STATES PATENTS

| 2,191,199 | Hall | Feb. 20, 1940 |
| 2,697,024 | Moss et al. | Dec. 14, 1954 |
| 2,700,012 | Merckell | Jan. 18, 1955 |

FOREIGN PATENTS

| 3,034 | Great Britain | of 1914 |
| 572,352 | Great Britain | Oct. 3, 1945 |
| 644,360 | Great Britain | Oct. 11, 1950 |
| 644,339 | Great Britain | Oct. 11, 1950 |

OTHER REFERENCES

Smith's Inorganic Chemistry, Century Co., N.Y., 1926, p. 760.

MacIntire: Ind. and Eng. Chem., February 1939, vol. 30, No. 2, pp. 160–162.

McClendon: J. Dent. Res., vol. 26, No. 3, June 1947, pp. 233–239.

Smith: Publ. No. 19, AAAS (1942) ("Fluorine and Dental Health"), pp. 12–22.

Wadwani: Current Sci. of India, November 1951, pp. 293–294.